United States Patent
Wang et al.

(10) Patent No.: US 12,450,520 B2
(45) Date of Patent: Oct. 21, 2025

(54) EXPERIMENT POINT RECOMMENDATION DEVICE, EXPERIMENT POINT RECOMMENDATION METHOD, AND SEMICONDUCTOR DEVICE MANUFACTURING DEVICE

(71) Applicant: Hitachi High-Tech Corporation, Tokyo (JP)

(72) Inventors: Yuyao Wang, Tokyo (JP); Yasuhide Mori, Tokyo (JP); Masashi Egi, Tokyo (JP); Takeshi Ohmori, Tokyo (JP); Satoshi Sakai, Tokyo (JP); Kohei Matsuda, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 211 days.

(21) Appl. No.: 17/641,214

(22) PCT Filed: Mar. 1, 2021

(86) PCT No.: PCT/JP2021/007716
§ 371 (c)(1),
(2) Date: Mar. 8, 2022

(87) PCT Pub. No.: WO2022/185380
PCT Pub. Date: Sep. 9, 2022

(65) Prior Publication Data
US 2024/0054385 A1    Feb. 15, 2024

(51) Int. Cl.
*G06N 20/00*    (2019.01)
(52) U.S. Cl.
CPC .................................... *G06N 20/00* (2019.01)
(58) Field of Classification Search
CPC ........ G06N 20/00; G06N 5/045; H01L 21/02; H01L 22/00; H01L 22/20
See application file for complete search history.

(56) References Cited

U.S. PATENT DOCUMENTS 11,151,710 B1 * 10/2021 Schleyen ............... G06T 7/0004
11,205,119 B2 * 12/2021 Karlinsky ......... G06F 18/24133
(Continued)

FOREIGN PATENT DOCUMENTS

JP    2011071296 A    4/2011
JP    2018049936 A    3/2018
(Continued)

OTHER PUBLICATIONS

Search Report mailed Jun. 1, 2021 in International Application No. PCT/JP2021/007716.
(Continued)

*Primary Examiner* — Nha T Nguyen
(74) *Attorney, Agent, or Firm* — Miles & Stockbridge, P.C.

(57) ABSTRACT

For a machine learning model that receives control parameters of a semiconductor processing device and outputs shape parameters that express a processed shape of a semiconductor sample processed by the semiconductor processing device, an experiment point obtaining learning data is recommended. A contribution of each control parameter to the prediction of the machine learning model is evaluated from feature quantity data that is a value of a control parameter of the learning data used for learning of the machine learning model, and the experiment point is recommended based on a stability evaluation and an uncertainty evaluation of the prediction by the machine learning model in a space defined by the control parameters selected based on the contribution as axes.

14 Claims, 11 Drawing Sheets

(56) References Cited

U.S. PATENT DOCUMENTS

| | | | |
|---|---|---|---|
| 11,580,375 B2* | 2/2023 | Bhaskar | G06N 3/08 |
| 2018/0082873 A1* | 3/2018 | Ohmori | G06N 5/04 |
| 2019/0064751 A1 | 2/2019 | Ohmori et al. | |
| 2020/0027021 A1* | 1/2020 | Sastry | G06N 20/00 |
| 2020/0110852 A1* | 4/2020 | Banna | G06F 30/39 |
| 2020/0111689 A1* | 4/2020 | Banna | G05B 13/0265 |
| 2021/0056425 A1* | 2/2021 | Jeong | G06F 18/217 |
| 2021/0116896 A1* | 4/2021 | Arabshahi | G06N 3/08 |
| 2021/0150387 A1* | 5/2021 | Rothstein | H01L 21/681 |
| 2021/0165399 A1* | 6/2021 | Roy | G05B 19/41875 |
| 2021/0183051 A1 | 6/2021 | Nakago et al. | |
| 2021/0209413 A1* | 7/2021 | Nakago | G06N 3/04 |
| 2021/0286270 A1* | 9/2021 | Middlebrooks | G06N 3/047 |
| 2021/0303757 A1* | 9/2021 | Pandey | G06F 30/27 |
| 2021/0334608 A1* | 10/2021 | Honda | G06V 10/764 |
| 2021/0365770 A1* | 11/2021 | Bhatia | G06N 3/045 |

FOREIGN PATENT DOCUMENTS

| | | | |
|---|---|---|---|
| JP | 2019040984 A | 3/2019 | |
| TW | 202024377 A | 7/2020 | |
| WO | 2010119939 A1 | 10/2010 | |

OTHER PUBLICATIONS

Office Action mailed dated Apr. 21, 2025 in Korean Application No. 10-2022-7003179.

* cited by examiner

FIG. 4

| # | CONTROL PARAMETER NAME | VALUE | RANGE | CONTRIBUTION EVALUATION | STABILITY EVALUATION | UNCERTAINTY EVALUATION |
|---|---|---|---|---|---|---|
| 1 | Source Power (W) | 750 | 650-850 | 0.2342 | 1 | 0.4 |
|  | ... | ... | ... | ... |  |  |
|  | SF6 (sccm) | 60 | 50-70 | -0.647 |  |  |
| 2 | ... |  |  |  |  |  |

71  72a  72b  72c  73  74  75

72

EXPERIMENT POINT RECOMMENDATION DEVICE, EXPERIMENT POINT RECOMMENDATION METHOD, AND SEMICONDUCTOR DEVICE MANUFACTURING DEVICE

TECHNICAL FIELD

The present invention relates to an experiment point recommendation device, an experiment point recommendation method, and a semiconductor device manufacturing system that effectively promote learning of a machine learning model.

BACKGROUND ART

Desirable semiconductor processing can be performed by processing a semiconductor sample under appropriate processing conditions in a semiconductor process. In recent years, new materials configuring the device have been introduced and a device structure has become complicated, and a control range of the semiconductor processing device has become expanded, and many control parameters have been added. The process has become multi-stepped, and fine and complicated processing has come to be realized. In order to produce a high-performance device (semiconductor device) by use of a semiconductor processing device, it is necessary to develop a process that derives appropriate processing conditions that realize a target processing shape of the semiconductor sample.

Optimization of a large number of control parameters is indispensable for fully utilizing the performance of semiconductor processing device, and its realization requires know-how of process development, high device operation skills, and a large number of trial and error of processing tests. Therefore, process development requires a large number of processing tests.

PTL 1 discloses that a predictive model showing a relationship between the processing conditions given to the semiconductor processing device and the processed result by the semiconductor processing device is generated, and a condition for outputting a target value of the processed result is estimated by use of the predictive model.

CITATION LIST

Patent Literature

PTL 1: Japanese Patent Application Laid-Open No. 2019-40984

SUMMARY OF INVENTION

Technical Problem

In order to properly estimate the conditions using the predictive model, the accuracy of the predictive model is required. In order to improve the accuracy of the predictive model, it is necessary to learn using a large number of learning data, which requires repetition of the processing test by the semiconductor processing device many times. The repetition of the processing test has a large effect on the cost and a period of process development, and therefore it is desirable to collect learning data that can effectively improve the accuracy of the predictive model.

Solution to Problem

According to an embodiment of the present invention, there is provided an experiment point recommendation device that recommends an experiment point that is a combination of values of control parameters set in a semiconductor processing device for an experiment to obtain learning data of a machine learning model that receives the control parameters of the semiconductor processing device and outputs shape parameters that express a processed shape of a semiconductor sample processed by the semiconductor processing device, the experiment point recommendation device including: a storage device that stores a contribution calculation program, a stability calculation program, and an uncertainty calculation program, an experiment point recommendation program; and a processor that executes the programs read from the storage device, in which the processor executes the contribution calculation program to evaluate the contribution of each control parameter to the prediction of the machine learning model from feature quantity data that is the value of the control parameter of the learning data used for learning of the machine learning model, the processor executes the stability calculation program to evaluate the stability of prediction by the machine learning model in a first space defined by control parameters selected based on the contribution as axes based on whether or not a change of the value of the selected control parameters causes an abnormal change in the prediction of the machine learning model, the processor executes the uncertainty calculation program to evaluate the uncertainty of prediction by the machine learning model in a second space defined by the selected control parameters as axes based on a distribution of the feature quantity data in the second space, and the processor executes the experiment point recommendation program to recommend an experiment point based on the contribution evaluation, the stability evaluation, and the uncertainty evaluation of the selected control parameters to the prediction of the machine learning model.

Advantage Effects of Invention

Learning data that effectively facilitates learning of the machine learning models can be obtained. Other challenges and new features will be apparent from the description and accompanying drawings herein.

BRIEF DESCRIPTION OF DRAWINGS

FIG. 4 is a diagram showing experiment point data.

DESCRIPTION OF EMBODIMENTS

Hereinafter, preferred embodiments of the present invention will be described with reference to the drawings.

Figure 1:
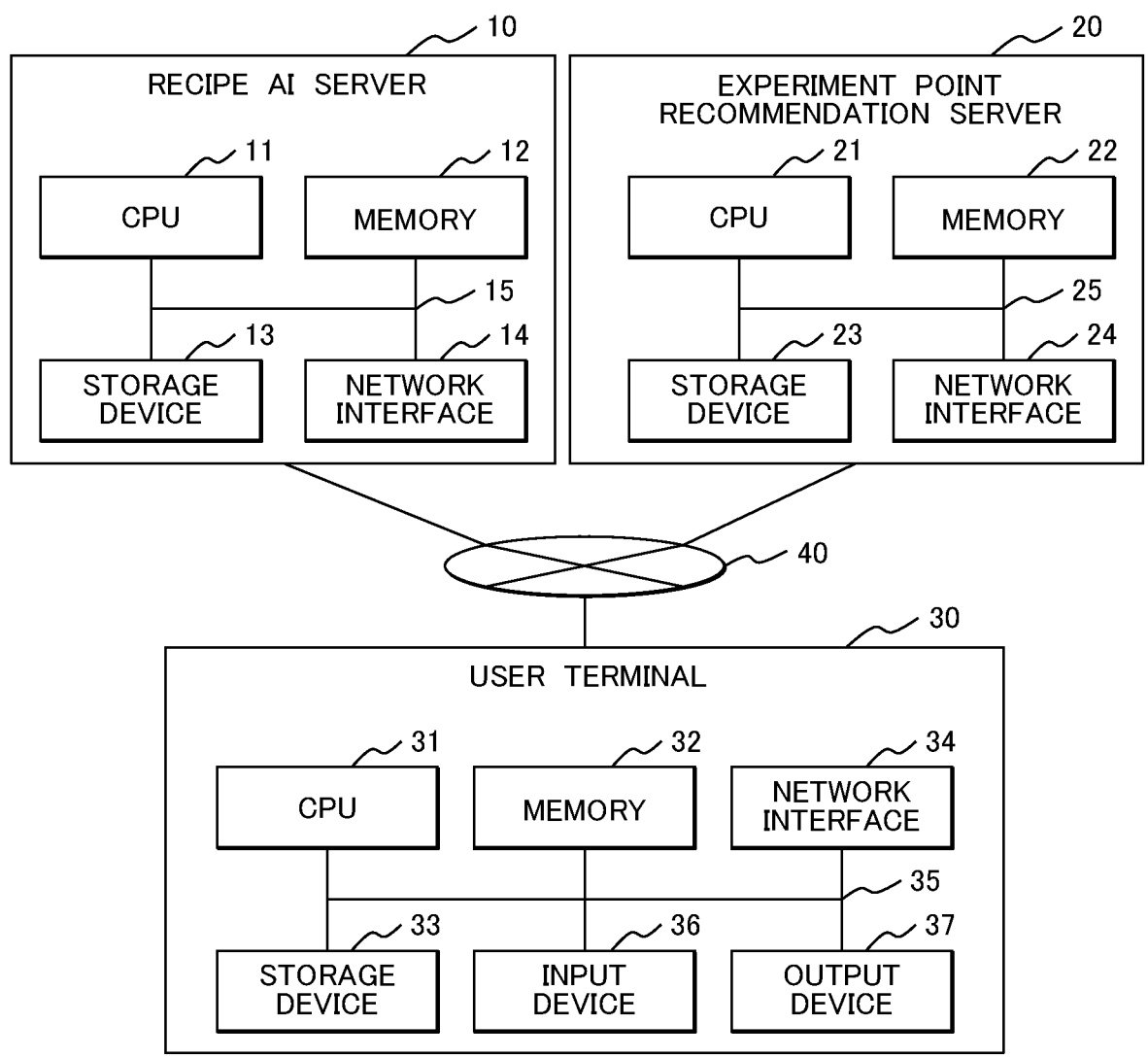
FIG. 1 is a system configuration diagram of an experiment point recommendation system.

FIG. 1 shows a system configuration diagram of an experiment point recommendation system. In the following, an example of using this system for process development of a semiconductor device will be described. In the process development, for a semiconductor processing device that processes semiconductor samples, appropriate processing conditions that realize a target processed shape are derived. A recipe AI (Artificial Intelligence) server 10 uses an AI model to predict a processed shape obtained by processing a semiconductor sample by a semiconductor processing device under predetermined processing conditions (recipe). The AI model is a machine learning model that receives control parameters of the semiconductor processing device and outputs shape parameters that express the processed shape of the semiconductor sample processed by the semiconductor processing device. In order to improve the accuracy of the AI model, it is necessary to learn using a large number of learning data, which is a set of control parameters and shape parameters. Therefore, it is necessary to repeat a work of processing the semiconductor sample while changing the control parameter given to the semiconductor processing device, and measuring the processed shape of the processed semiconductor sample to obtain the shape parameter (hereinafter referred to as "experiment"). The experiment requires time and cost because there is a need to have the semiconductor processing device actually perform the processing. Therefore, if an effective control parameter can be selected as the control parameter for conducting experiments in order to improve the accuracy of the AI model, the time required for process development will be shortened and the cost will be reduced. However, since there are many control parameters for the semiconductor processing device that are adjusted during process development, there are innumerable combinations of control parameter values that are candidates for experiment points. An experiment point recommendation server 20 supports the identification of such appropriate combination of control parameter values in order to improve the accuracy of the AI model of a recipe AI server 10. The user conducts an experiment on the combination of the control parameter values recommended by the experiment point recommendation server 20 and continues the learning of the AI model by use of the obtained learning data so as to accelerate the learning of the AI model.

The user accesses the recipe AI server 10 and the experiment point recommendation server 20 from a user terminal 30, and executes the learning of the AI model and the selection of the experiment point for obtaining the learning data of the AI model. As shown in FIG. 1, the recipe AI server 10, the experiment point recommendation server 20, and the user terminal 30 can be connected to each other through a network 40. The recipe AI server 10, the experiment point recommendation server 20, and the user terminal 30 are all information processing devices, and a basic configuration of hardware is the same. Therefore, the user terminal 30 will be described below as an example.

The user terminal 30 includes a CPU (Central Processing Unit) 31, a memory 32, a storage device 33, a network interface 34, an input device 36, and an output device 37, which are connected to each other by a bus 35. A GUI (Graphical User Interface) is implemented by the input device 36, which is a keyboard or pointing device, and a display, which is the output device 37, and the user can use the system interactively through the GUI. The network interface 34 is an interface for connecting to the network 40.

The storage device 33 is usually formed of an HDD (Hard Disk Drive), an SSD (Solid State Drive), or the like, and stores a program executed by the user terminal 30 or data to be processed by the program. The memory 32 is formed of a RAM (Random Access Memory), and temporarily stores the program and the data required to execute the program according to an instruction from the CPU 31. The CPU 31 executes the program loaded from the storage device 33 to the memory 32.

The user terminal 30 is, for example, a PC (Personal Computer) or a tablet. In addition, although FIG. 1 shows an example in which the recipe AI server 10 and the experiment point recommendation server 20 are mounted on different information processing devices, but may be mounted on the same information processing device or mounted on a cloud.

Figure 2:
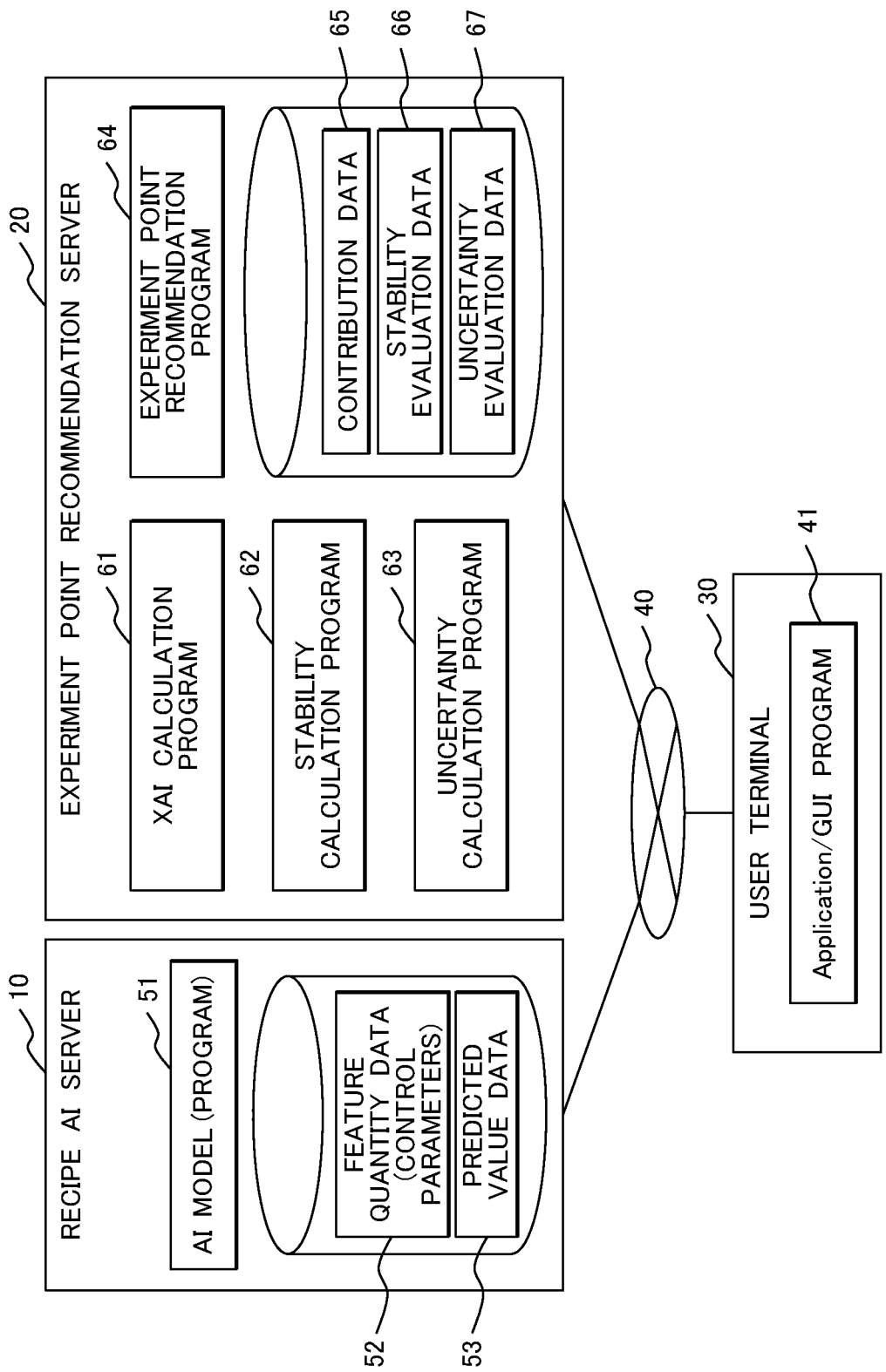
FIG. 2 is a diagram showing programs and data for experiment point recommendation processing held by each information processing device.
Figure 3:
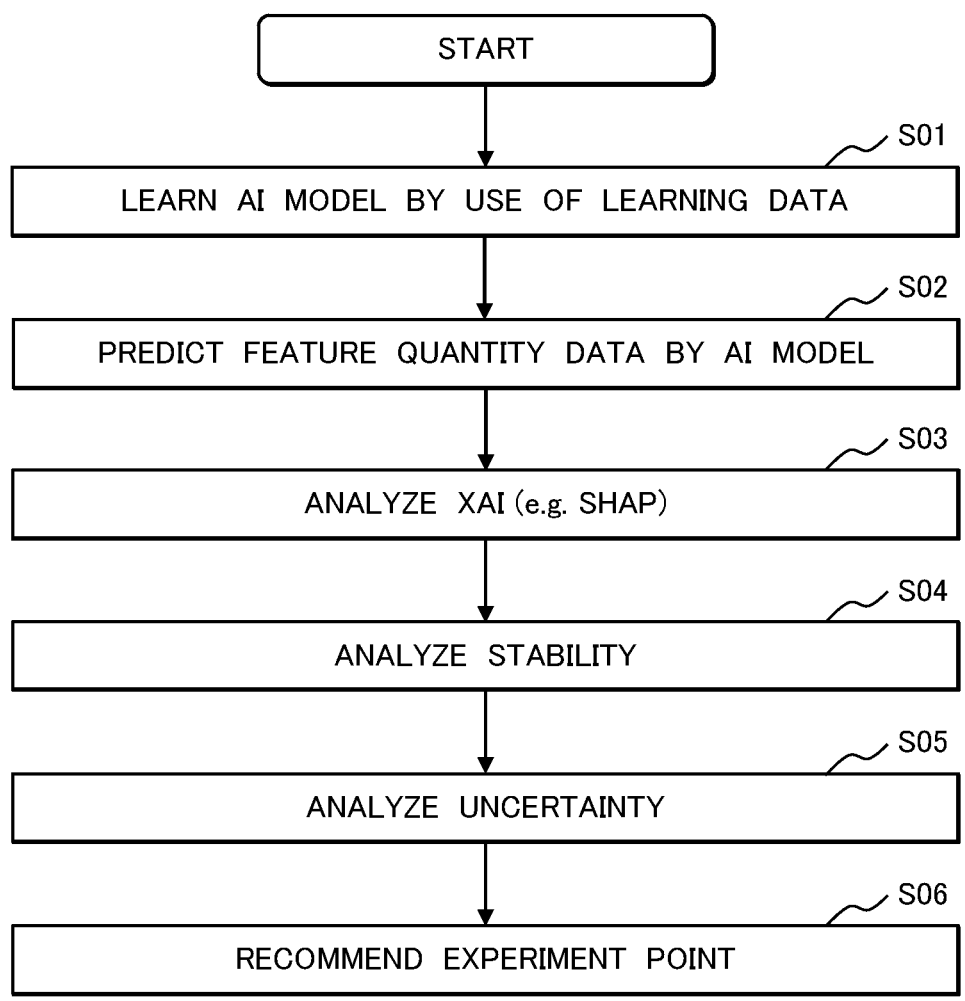
FIG. 3 is a flow chart of the experiment point recommendation processing.

FIG. 2 shows the program and data for the experiment point recommendation process held by the storage device of each information processing device, and FIG. 3 shows a flow of an experiment point recommendation process. An application/GUI program 41 of the user terminal 30 performs processing such as inputting a user's instruction to this system and presenting the processing result of the system to the user. The user executes the experiment point recommendation process by using the application/GUI program 41 of the user terminal 30.

The recipe AI server 10 learns an AI model 51 by using the learning data (S01). The AI model 51 receives the control parameters of the semiconductor processing device, and predicts and outputs a shape parameter of a semiconductor sample processed by the semiconductor processing device in which the control parameters are set. The learning data is a set of the control parameter and the shape parameter, and the shape parameter of the learning data is obtained by actually setting the control parameter in the semiconductor processing device and processing the semiconductor sample.

In the present example, a value (feature quantity data 52) of the control parameter of the learning data used for learning the AI model 51 is used to search for a new experiment point. After Step S01, the recipe AI server 10 inputs the feature quantity data 52, which is the value of the control parameter used for learning, into the AI model 51 that has finished learning, and obtains a predicted value data 53 (S02).

An XAI (Explainable AI) calculation program 61 held by the experiment point recommendation server 20 is a program that interprets a basis on which the AI model 51 has performed the prediction. Since the content of the AI model 51 is a black box, it is not clear why the prediction has been obtained as it is. The XAI calculation program 61 calculates contribution data 65 which indicates the contribution of each input to the prediction result as one of the reasons why the AI model 51 has reached such a prediction. An SHAP (Shapley Additive explanations) has been known as a tool for performing such calculations. The experiment point recommendation server 20 obtains the contribution data 65 of each control parameter of the feature quantity data 52 for the predicted value data 53 by the XAI calculation program 61 (S03).

The number of control parameters for semiconductor processing device is extremely large. Therefore, the contribution data 65 selects a small number of control parameters that contribute significantly to the predicted value, that is, a small number of control parameters that greatly affect the processed shape, and executes the subsequent processing.

In order to select an experiment point at which effective learning data for promoting learning of the AI model 51 can be obtained, in the present example, the experiment point is evaluated from the two viewpoints of stability and uncertainty. The details will be described later, but stability means that the predicted value does not cause an abnormal change (for example, the predicted shape is not destroyed) by changing the value of the control parameter. The uncertainty means that the accuracy of the AI model prediction is low.

The experiment point recommendation server 20 obtains stability evaluation data 66 for the feature quantity data 52 by use of the stability calculation program 62 (S04), and obtains uncertainty evaluation data 67 for the feature quantity data 52 by use of the uncertainty calculation program 63 (S05). After that, with the use of an experiment point recommendation program 64, the experiment points for obtaining the next learning data according to the intention of the user are recommended based on contribution data 65, stability evaluation data 66, and the uncertainty evaluation data 67. (S06).

FIG. 4 shows an example of the experiment point data obtained by the experiment point recommendation process. An ID71 is an ID that uniquely identifies the experiment point. The experiment point is defined as a combination of the values of multiple control parameters, and control parameter information 72 includes a name 72a, a value 72b, and a range 72c. The value 72b is set to be included in the range 72c. Those values and units differ depending on the control parameter. In this example, an electric power [W] and a flow rate [sccm] are exemplified. A contribution evaluation information 73 indicates the contribution of each control parameter when prediction is performed for the experiment point by the AI model, and is calculated by the XAI calculation program 61. Stability evaluation information 74 and uncertainty evaluation information 75 are values obtained by the stability analysis (Step S04) and the uncertainty analysis (Step S05) for each experiment point, respectively.

Figure 5:
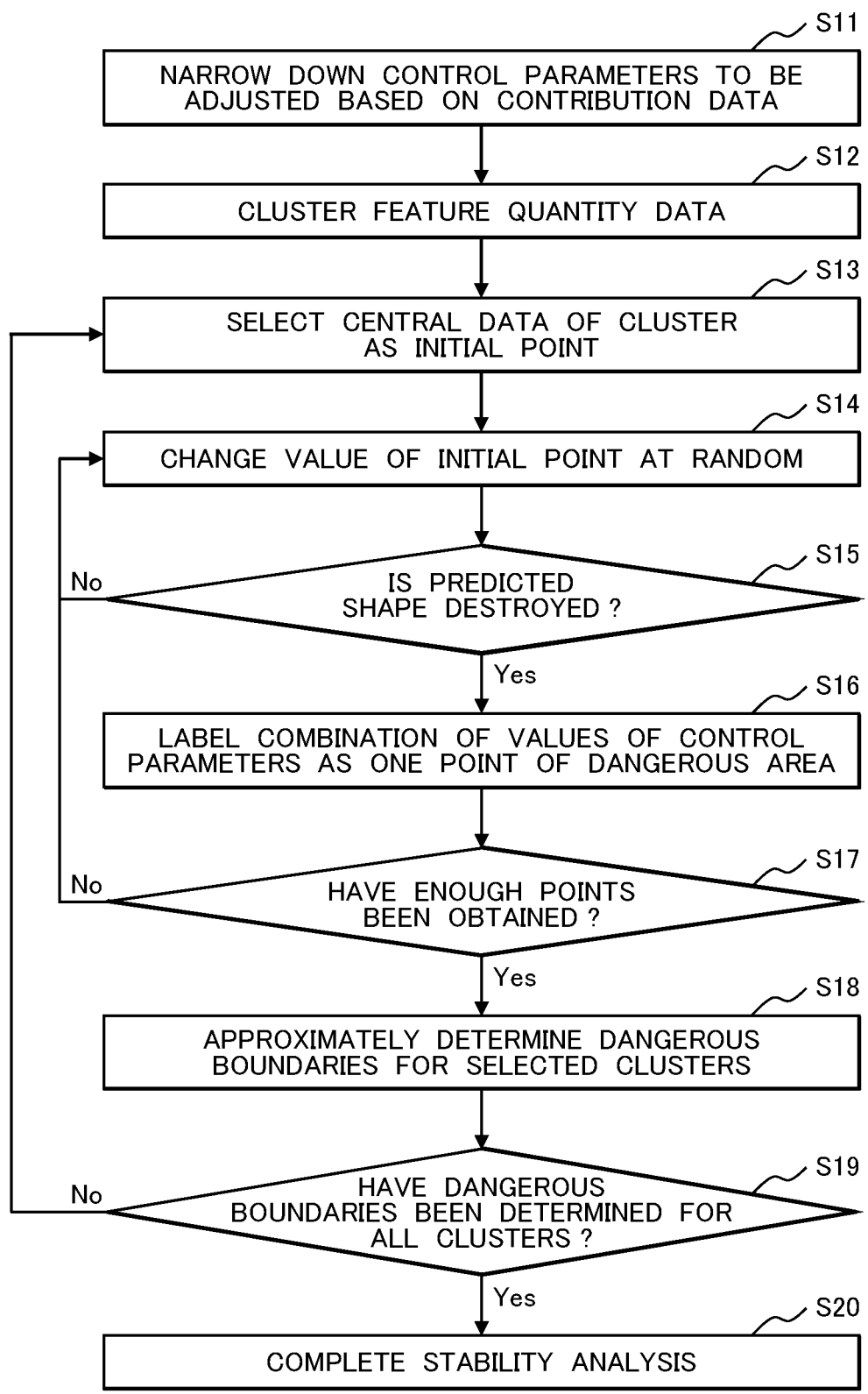
FIG. 5 is a processing flow of stability analysis.

FIG. 5 shows a processing flow of the stability analysis (Step S04). As mentioned above, the control parameters to be adjusted are narrowed down based on the contribution data 65 (S11). In this example, it is assumed that top two control parameters with the highest contribution are selected, and the processing for the following feature quantity data 52 is executed for the control parameters narrowed down in Step S11.

Figure 6A:
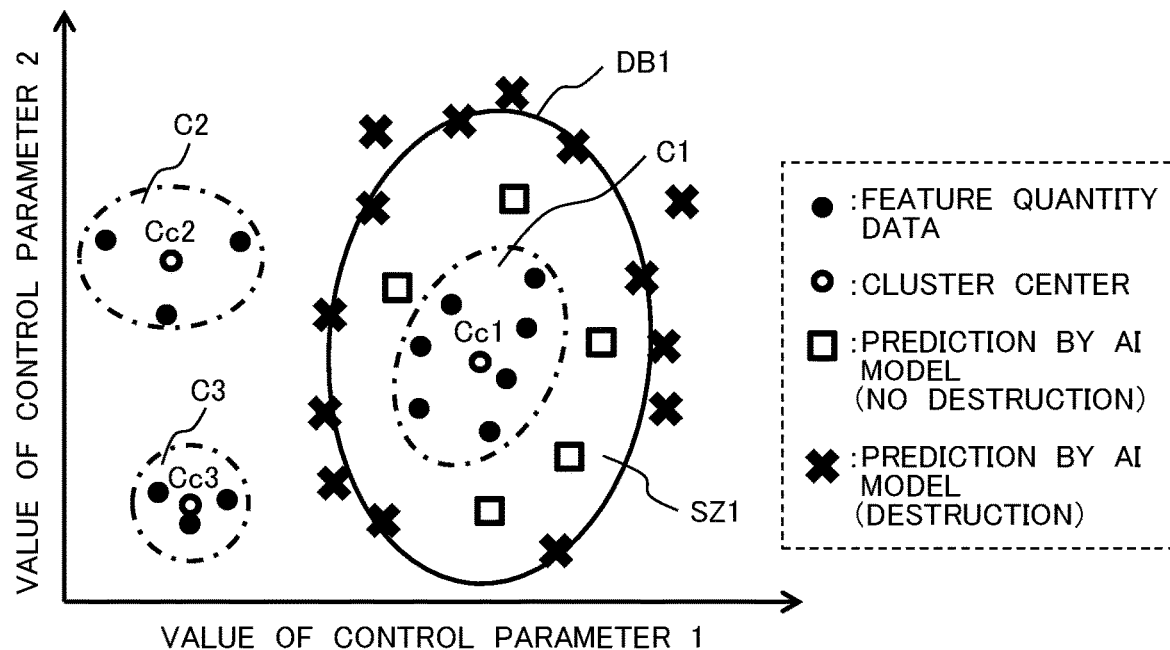
FIG. 6A is a schematic diagram illustrating the stability analysis.

First, the feature quantity data 52 is clustered (S12), and the center data of the cluster is selected as an initial point (S13). FIG. 6A shows a schematic diagram illustrating the stability analysis. FIG. 6A shows how the feature quantity data 52 is clustered in a feature quantity space defined by the control parameter 1 and the control parameter 2 as axes. In this example, three clusters C1 to C3 are formed, and each of cluster centers Cc1 to Cc3 is represented. In this example, the cluster center may be any experiment point that represents the cluster, and a method of obtaining the cluster center is not particularly limited. The feature quantity data closest to the cluster center may be the cluster center.

Figure 6B:
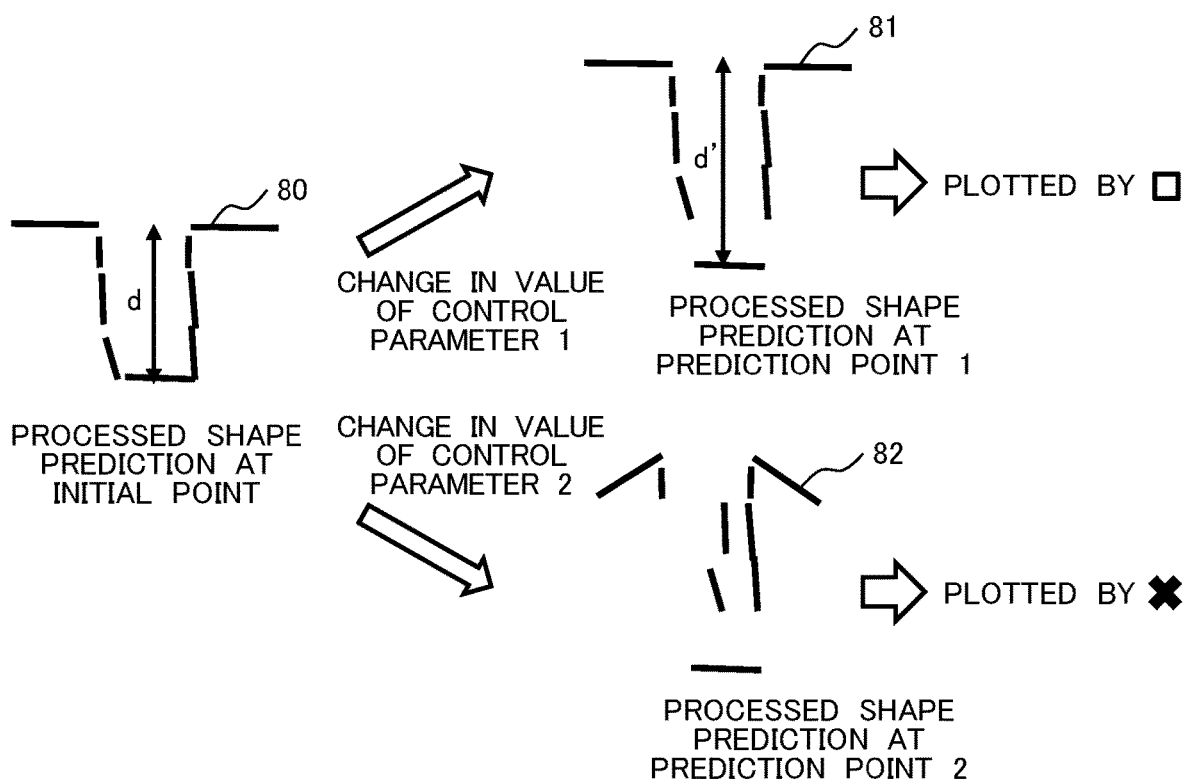
FIG. 6B shows a processing example of Steps S14 to S15 in a stability analysis process.

Subsequently, the value of the control parameter of the initial point is changed at random (S14), and predicted by the AI model 51 (S15). FIG. 6B shows a processing example of Steps S14 to S15. It is assumed that a processed shape 80 predicted at the initial point is a groove shape with a depth d. With a change in the value of the control parameter, the predicted processed shape changes. For example, at a prediction point 1, a processed shape 81 in which the groove depth has been changed to d' is predicted, and at a prediction point 2, a destroyed processed shape 82 is predicted.

If the value of the control parameter is changed in this way and the predicted shape is destroyed (Yes in S15), the prediction point (combination of the values of the control parameters) is labeled as one point in a danger area (S16). If the predicted shape is not destroyed (No in S15), the value of the control parameter at the initial point is changed at random again (S14), and the same processing is performed, and repeated until the prediction point that is labeled as the danger point reaches a sufficient number (S17). Once a sufficient number has been obtained, a danger boundary is approximately determined (S18). The inside of the danger boundary shall be called a safe zone.

FIG. 6A shows a state where for a cluster C1, the prediction points at which the shape has been predicted by the AI model 51 in Steps S14 to S17 are plotted while distinguishing between the prediction points at which the processed shape without destruction has been obtained and the prediction points at which the destroyed processed shape has been obtained (see FIG. 6B). The farther away from the cluster center Cc1, the more likely it is that the destroyed processed shape will be obtained. Therefore, the danger boundary can be determined so as to separate between an area (danger area) where the prediction points at which the broken processed shape has been obtained is predominantly present and an area (safe zone) where the prediction points at which the processed shape without breakage is predominantly present. It should be noted that multiple danger boundaries may be provided corresponding to the frequency of obtaining the destroyed processed shape. For example, as in the uncertainty analysis to be described later, a large number of sampling points are taken in the feature quantity space, and the number of x plots included in a circle with a radius $\gamma$ centered on each of sampling points is counted. This makes it possible to grasp the density of x plots in the feature quantity space and set multiple danger boundaries.

When the danger boundaries for all clusters are determined (Yes in S19), the stability analysis is completed (S20). At the end, the coordinates of the danger boundaries in the feature quantity space (when multiple danger boundaries are obtained, the definitions and coordinates of each of the multiple danger boundaries) are stored as stability evaluation data 66. Alternatively, the coordinates of the prediction points at which the destroyed processed shape has been obtained may be stored as the stability evaluation data 66.

Figure 7:
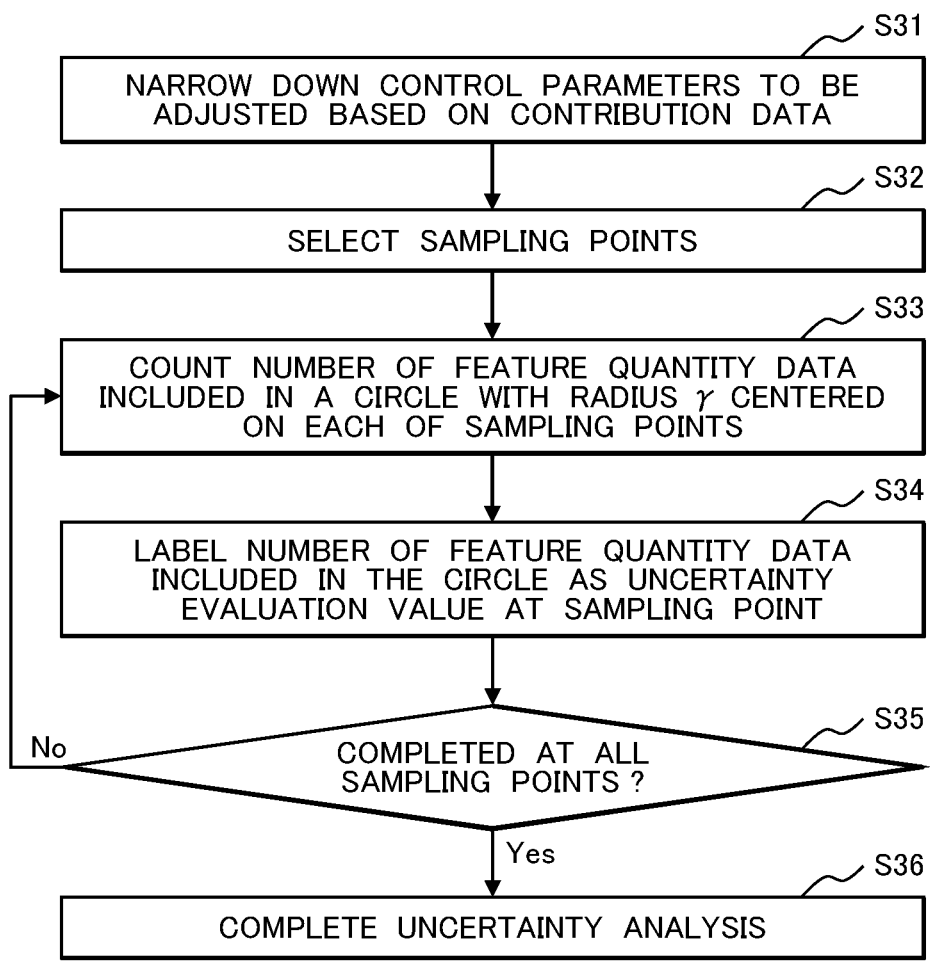
FIG. 7 is a processing flow of uncertainty analysis.

FIG. 7 shows a processing flow of the uncertainty analysis (Step S05). Uncertainty is an evaluation based on the accuracy of prediction of the AI model. In the feature quantity space defined by the control parameter as axes, it is assumed that there are a first area where there are many experiment points already used as learning data of the AI model, and a second area where there are few experiment points used as learning data for the AI model. If a new experiment point is contained in the first area, the accuracy of the prediction of the AI model is high (low uncertainty), and if the new experiment point is contained in the second area, the accuracy of prediction of the AI model is low (high uncertainty).

As described above, in the present example, the uncertainty is determined based on the distribution of the experiment points in the feature quantity space, but in order to evaluate the distribution state, it is necessary to be able to define a distance in the space. However, since the units of the control parameters are various and the range that the control parameters can be obtained are also various, the values of the control parameters cannot be used as they are. Therefore, in order to evaluate the distribution of the experiment points, a contribution conversion value (hereinafter referred to as an XAI conversion value) based on the contribution of the control parameter calculated by the XAI calculation program 61 is used. A case where the shape parameter as a processing target is a depth of a groove is exemplified. If the groove depth (shape parameter) in the predicted processed shape is a groove of 10 nm, the contribution of the control parameter 1 is 50% and the contribution of the control parameter 2 is 30%, a value obtained by allocating the depth of the groove according to the degree of contribution is the XAI conversion value. In this case, the XAI conversion value of the control parameter 1 is 5 (=10×0.5) nm, and the XAI conversion value of the control parameter 2 is 3 (=10×0.3) nm. Even with control parameters of different units in this way, the distribution of experiment points in the feature quantity space can be properly evaluated by evaluating with the XAI conversion value, which is a proportional scale. The feature quantity space whose units are aligned according to the XAI conversion value is called an XAI space.

First, the control parameters to be adjusted are narrowed down based on the contribution data 65 (S31). This step is the same process as Step S11 in FIG. 5, and if the stability analysis is performed before the uncertainty analysis as shown in FIG. 3, it is not necessary to perform the stability analysis again.

Figure 8:
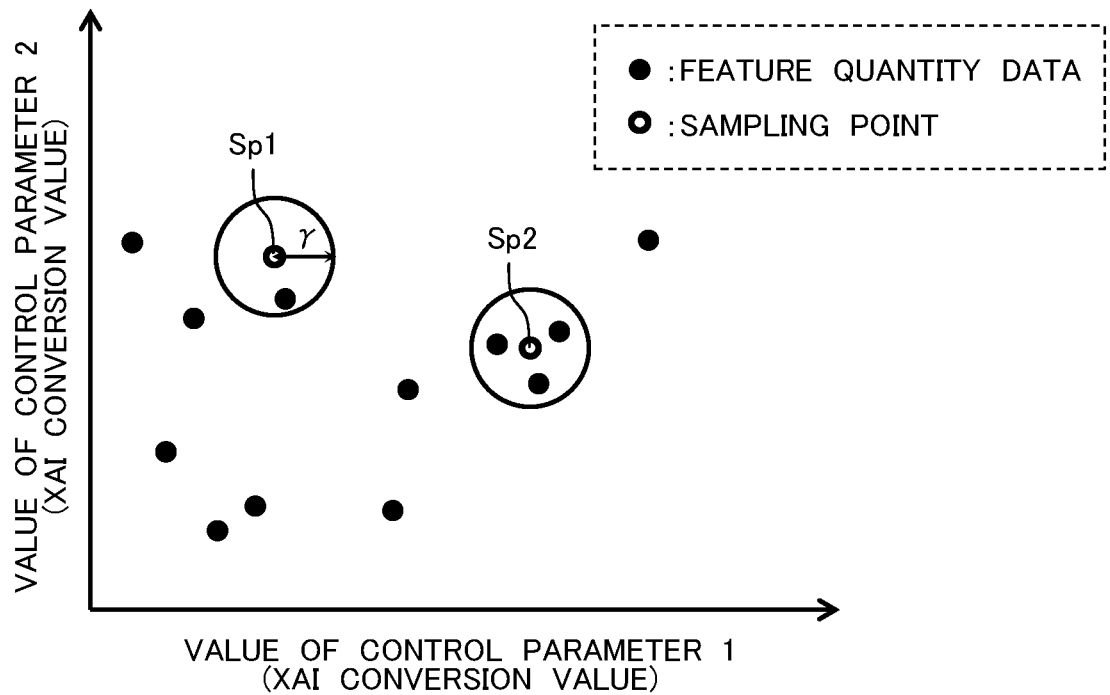
FIG. 8 is a schematic diagram illustrating the uncertainty analysis.

FIG. 8 shows a schematic diagram illustrating the uncertainty analysis. The feature quantity data 52 is distributed in the XAI space defined by the value of a control parameter 1 (XAI conversion value) and the value of a control parameter 2 (XAI conversion value) as axes. In order to evaluate the distribution of the feature quantity data 52 in the XAI space, the following processing is performed.

The sampling points are selected in the XAI space (S32). The sampling points are selected so as to be sufficiently dense in the XAI space. The sampling points may be set at random in the XAI space or may be set regularly (for example, in a grid pattern). The number of the feature quantity data included in a circle with a radius $\gamma$ centered on each of sampling points is counted (S33), and the number of the feature quantity data included in the circle is labeled as the uncertainty evaluation value at the sampling point (S34). FIG. 8 shows the circles with the radius of $\gamma$ centered on two sampling points Sp1 and Sp2. In this case, the uncertainty evaluation value of the sampling point Sp1 is 1, and the uncertainty evaluation value of the sampling point Sp2 is 3. When the sampling points are set to be sufficiently dense, the distribution of the feature quantity data in the XAI space can be evaluated by the uncertainty evaluation value for each sampling point. This process is repeated for all sampling points (S35).

When the uncertainty evaluation value is obtained for all sampling points (Yes in S35), the uncertainty analysis is completed (S36). At the end, the uncertainty evaluation value at each sampling point in the XAI space is stored as uncertainty evaluation data 67.

The size of the radius $\gamma$ centered on the sampling point affects the resolution of the uncertainty evaluation. Therefore, the uncertainty evaluation values at the sampling points are obtained with different sizes of the radius $\gamma$ and the uncertainty evaluation value at the sampling points obtained with the radius $\gamma$ that gives a desired resolution may be used so that the subsequent processing is performed.

Figure 9:
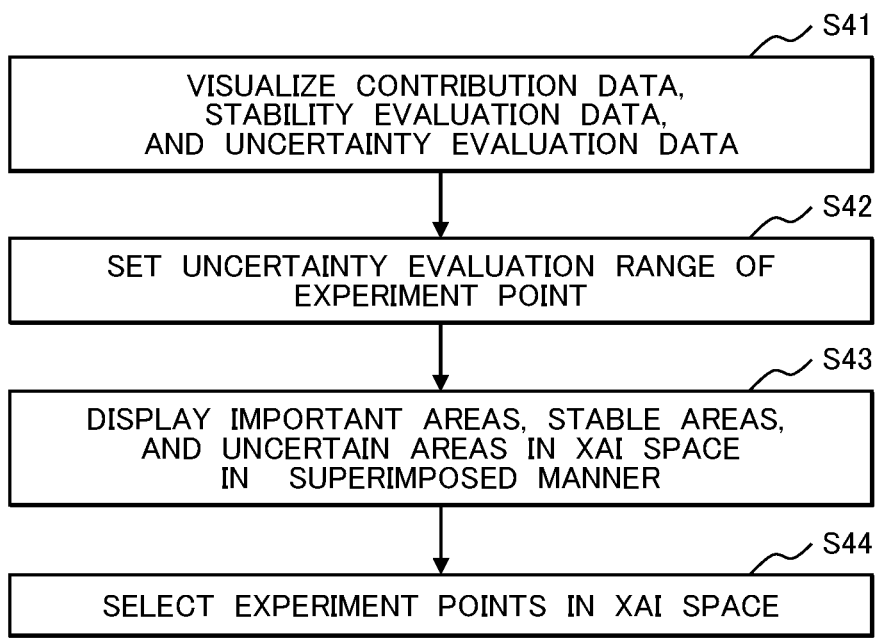
FIG. 9 is a processing flow of experiment point recommendation.
Figure 10:
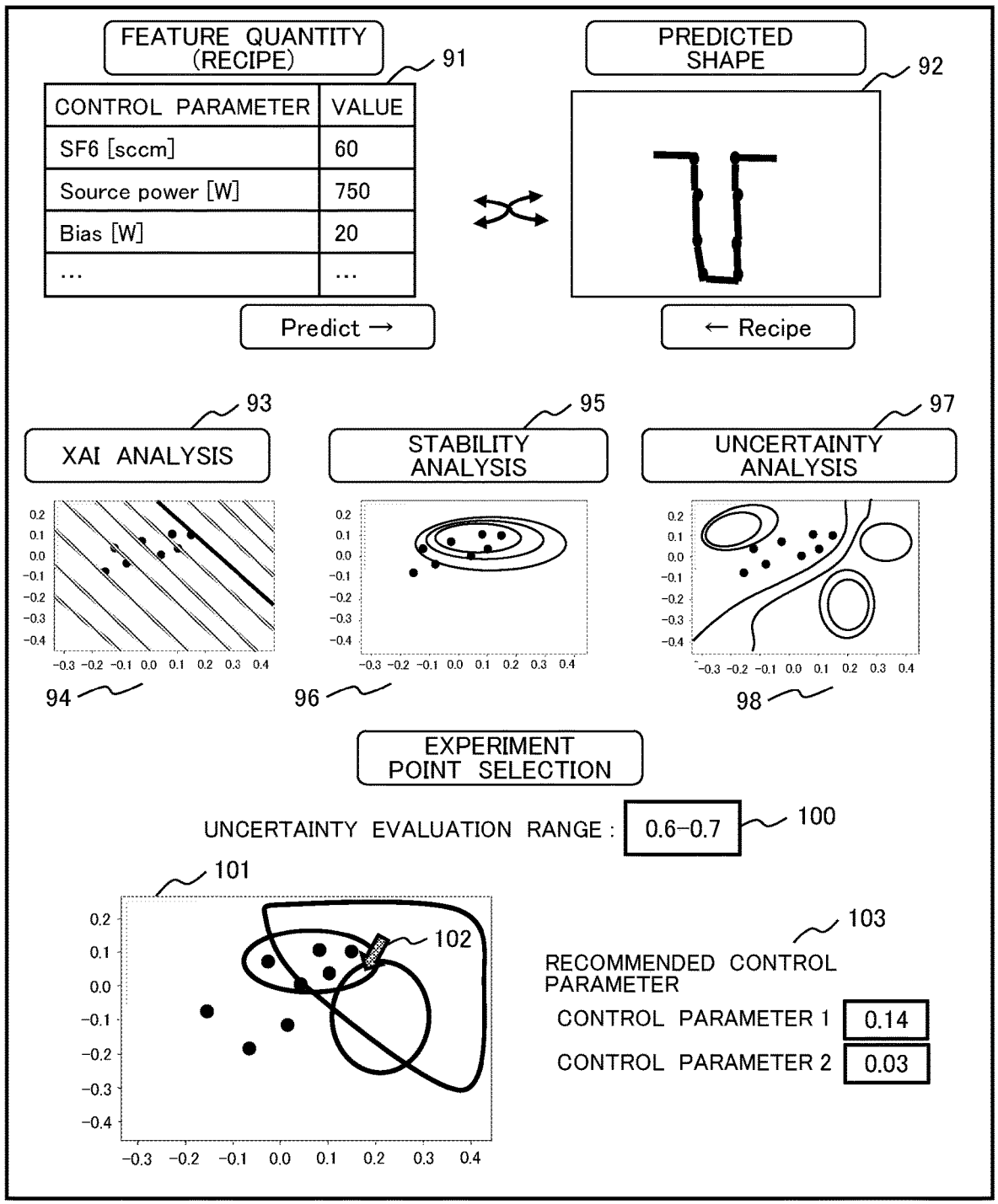
FIG. 10 shows an example of a display screen.

FIG. 9 shows a processing flow of the experiment point recommendation (Step S06). In addition, FIG. 10 shows a display screen 90 as an example of the GUI displayed on the user terminal 30. The display screen 90 includes both the GUI for the recipe AI server 10 and the experiment point recommendation server 20. When the combination of control parameter values is set in a control parameter (recipe) input field 91, the recipe AI server 10 inputs the combination of the set control parameter values to the AI model 51, images the output shape parameter, and displays the shape parameter in a predicted shape field 92.

The results of the XAI analysis (Step S03 in FIG. 3), the stability analysis (Step S04 in FIG. 3), and the uncertainty analysis (Step S05 in FIG. 3) performed by the experiment point recommendation server 20 are displayed in the XAI analysis result display field 93, the stability analysis result display field 95, and the uncertainty analysis result display field 97, respectively. With the execution of the experiment point recommendation program 64, the experiment point recommendation server 20 visualizes the contribution data 65, the stability evaluation data 66, and the uncertainty evaluation data 67 so that the user can easily understand the results, and displays those pieces of data in each display field of the display screen 90 displayed on the terminal 30 (S41). The example in FIG. 10 displays the results in a format that displays the distribution of the feature quantity data 52 in the XAI space and contour lines of an index that evaluates the appropriateness as an experiment point from each result. Furthermore, the display format of each display field may be changed between multiple display formats.

Figure 11A:
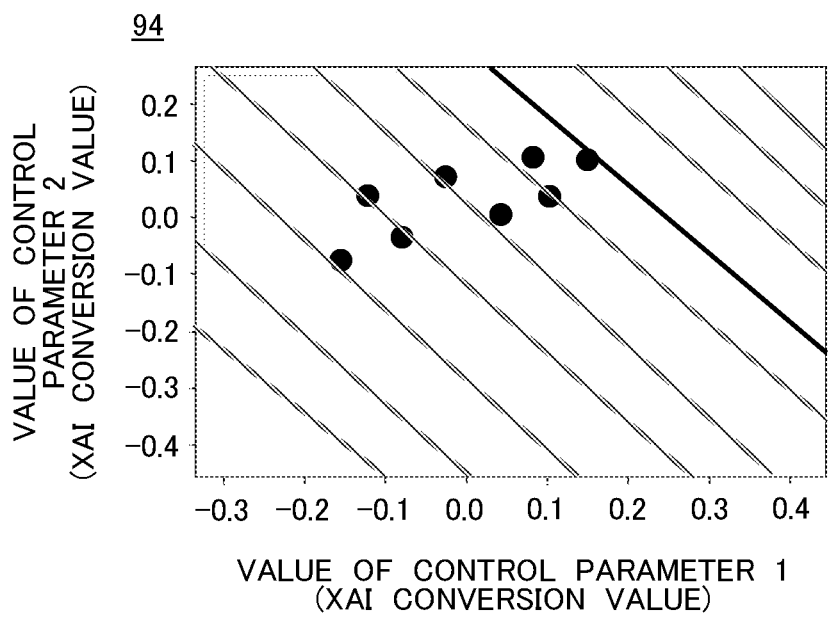
FIG. 11A shows a display example of an XAI analysis result.

FIG. 11A shows an XAI analysis result 94 based on the contribution data 65. The distribution of the feature quantity data 52 in the XAI space defined by the control parameter 1 and the control parameter 2 and the contour lines of the importance index are displayed. In the XAI analysis, since the contribution of each control parameter to the prediction result is calculated, the control parameter 1 and control parameter 2 are less important to the prediction result toward a lower left space of the XAI space, and the control parameter 1 and the control parameter 2 are more important to the prediction result toward an upper right space. Therefore, the contour lines of the importance index are lines downward to the right.

Another potential display format for the XAI analysis results is to display the representative values (average value, median value, etc.) of the contribution calculated for the feature quantity data 52 for each control parameter.

Figure 11B:
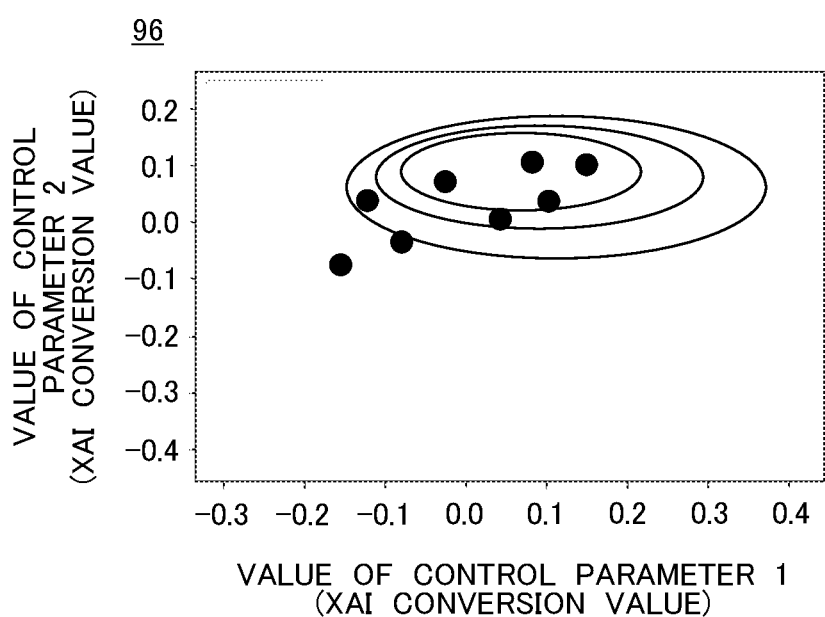
FIG. 11B shows a display example of a stability analysis result.

FIG. 11B shows a stability analysis result 96 based on the stability evaluation data 66. The distribution of the feature quantity data 52 in the XAI space defined by the control parameter 1 and the control parameter 2 and the contour lines of the stability index are displayed. In the contour lines of the stability index in the XAI space, the danger boundaries in the feature quantity space are converted to the XAI space and mapped.

As a display format of the stability analysis result, a format for displaying the distribution of the feature quantity data 52 in the feature quantity space and the danger boundary can be considered.

Figure 11C:
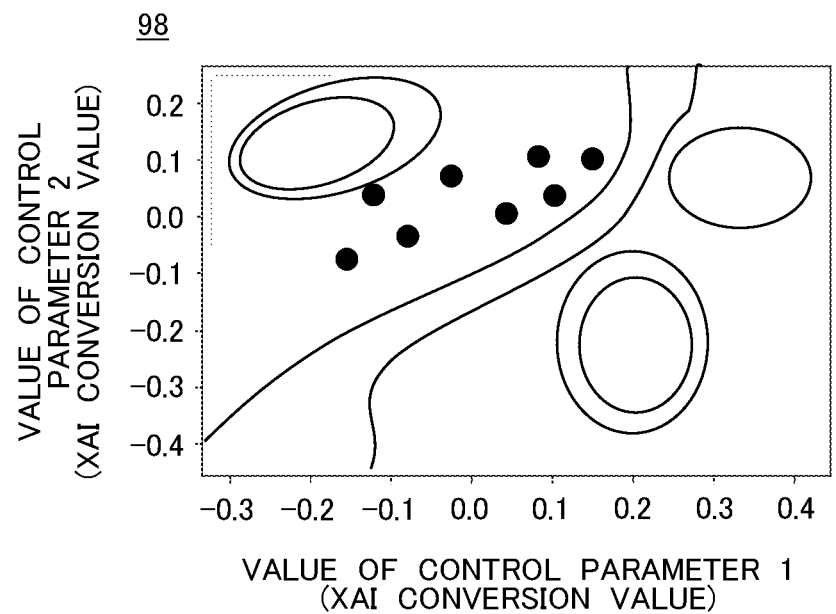
FIG. 11C is a display example of an uncertainty analysis result.

FIG. 11C shows an uncertainty analysis result 98 based on the uncertainty evaluation data 67. The distribution of the feature quantity data 52 in the XAI space defined by the control parameter 1 and the control parameter 2 and the contour lines of the uncertainty index are displayed. The contour lines of the uncertainty index in the XAI space are drawn based on the uncertainty evaluation value at each sampling point. That is, the contour lines are drawn in the XAI space so that the values of the uncertainty evaluation values at the sampling points sandwiched between the two contour lines are equal.

Next, the user sets the uncertainty evaluation range of the experiment point (S42). The user sets the uncertainty evaluation range by inputting a value in an uncertainty evaluation range input field 100 of the display screen 90. If the uncertainty index is too high or too low, the learning effect on the AI model will be diminished, so that the user sets an appropriate range from the distribution of the feature quantity data 52. The range of other indexes is set in the system. The importance index is better to select the experiment point where the contribution of the two control parameters that have performed the stability analysis and that uncertainty analysis is large. This is because there is a risk that the processing results as predicted by the AI model may not be obtained in areas where the contribution of the control parameters is small. In addition, if the processing shape is destroyed by the semiconductor processing device, the information obtained will be scarce, so that it is better to select a combination of control parameters that can process without causing destruction as an experiment point. Therefore, it is desirable to also select a high value for the stability index. It is needless to say that the user may be able to set a range for the importance index and the stability index as well as the uncertainty index.

Figure 12:
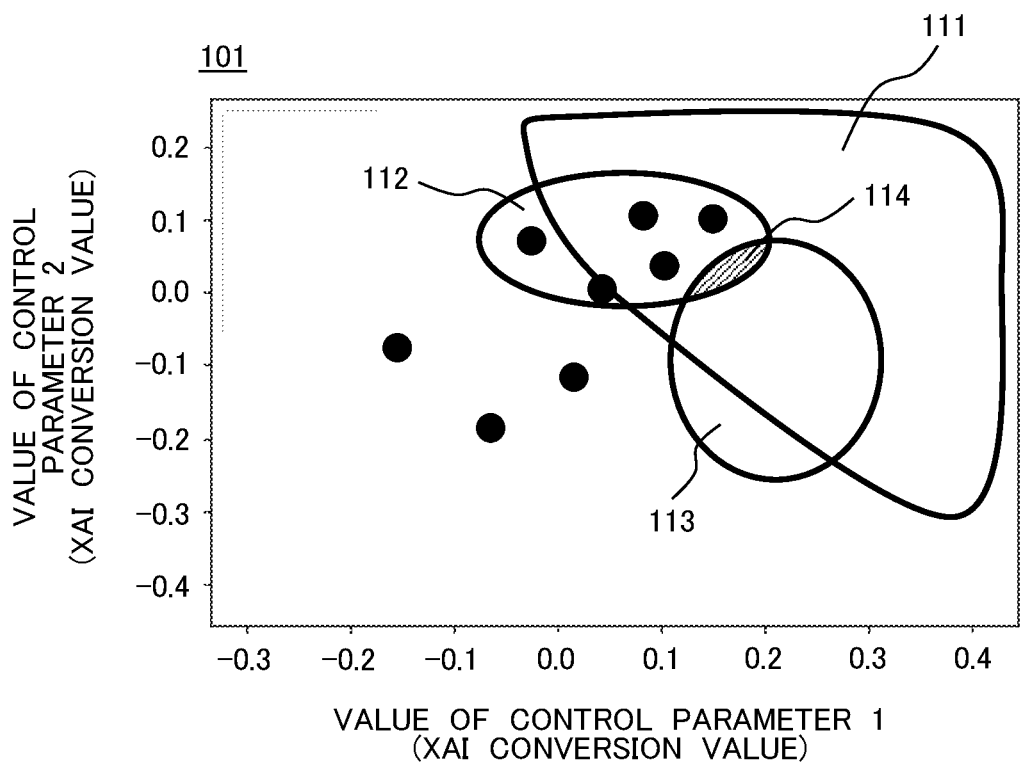
FIG. 12 shows an example of an experiment point selection diagram.

The experiment point recommendation server 20 displays an experiment point selection diagram 101 on the display screen 90 by executing the experiment point recommendation program 64 (S43). The experiment point selection diagram 101 is shown in FIG. 12. The experiment point selection diagram 101 displays, in a superimposed manner, an important area 111, a stable area 112, and an uncertainty area 113 having the uncertainty evaluation range set in Step S42 on the XAI space. The important area 111 is obtained from the XAI analysis result, the stable area 112 is obtained from the stability analysis result, and the uncertain area 113 is obtained from the uncertainty analysis result. The user selects the experiment point based on the overlap of the three areas (S44). In the example of FIG. 12, it is highly possible that learning data that promotes learning of the AI model 51 can be obtained by selecting the experiment point in an overlapping area 114 in which three areas overlap with each other.

The selection of the experiment point in Step S44 can be performed by designating one point with a cursor 102 for the XAI space displayed in the experiment point selection diagram 101 of the display screen 90 (see FIG. 10). The value at the position specified by the cursor 102 is displayed in the recommended control parameter display field 103. The value in the display field 103 may be displayed as an XAI conversion value, or the value of the control parameter may be displayed.

The present invention has been described above according to the examples, but various modifications can be performed. For example, the example of specifying the experiment point on the XAI space displayed in two dimensions has been described. Alternatively, for example, if the GUI displays the XAI space in three dimensions, the experiment point that optimizes the three control parameters can be selected. Furthermore, the present invention is not limited to the method of selecting the experiment point by the XAI space displayed on the GUI. For example, an integrated score based on the stability evaluation value and the uncertainty evaluation value may be obtained, and the experiment point may be selected so as to increase the integrated score. The integrated score S can be defined as, for example, S=a×(stability evaluation value)+b×(uncertainty evaluation value), where a and b are weights.

As an embodiment of the examples described above, a semiconductor device manufacturing system in which an application for operating and managing a production line including a semiconductor processing device is executed on a platform can be considered. The semiconductor processing device is connected to the platform through a network and is controlled by the platform. In this case, the present example can be implemented in the semiconductor device manufacturing system by executing each process by using the recipe AI server 10 and the experiment point recommendation server 20 as applications on the platform.

REFERENCE SIGNS LIST

10: recipe AI server, 11, 21, 31: CPU, 12, 22, 32: memory, 13, 23, 33: storage device, 14, 24, 34: network interface, 15, 25, 35: bus, 20: experiment point recommendation server, 30: user terminal, 36: input device, 37: output device, 40: network, 41: application/GUI program, 51: AI model, 52: feature quantity data, 53: predicted value data, 61: XAI calculation program, 62: stability calculation program, 63: uncertainty calculation program, 64: experiment point recommendation program, 65: contribution data, 66: stability evaluation data, 67: uncertainty evaluation data, 71: ID, 72: control parameter information, 72a: name, 72b: value, 72c: range, 73: contribution evaluation information, 74: stability evaluation information, 75: uncertainty evaluation information, 80, 81, 82: processed shape, 90: display screen, 91: control parameter (recipe) input field, 92: predicted shape field, 93: XAI analysis result display field, 94: XAI analysis result, 95: stability analysis result display field, 96: stability analysis result, 97: uncertainty analysis result display field, 98: uncertainty analysis result, 100: uncertainty evaluation range input field, 101: experiment point selection diagram, 102: cursor, 103: recommended control parameter display field, 111: important area, 112: stable area, 113: uncertain area, 114: overlapping area.

The invention claimed is:

1. An experiment point recommendation device that recommends an experiment point that is a combination of values of control parameters set in a semiconductor processing device for an experiment to obtain learning data of a machine learning model that receives control parameters of the semiconductor processing device and outputs shape parameters that express a processed shape of a semiconductor sample processed by the semiconductor processing device, the experiment point recommendation device comprising:

a storage device that stores a contribution calculation program, a stability calculation program, an uncertainty calculation program, and an experiment point recommendation program; and a processor that executes the programs read from the storage device, wherein the processor executes the contribution calculation program to evaluate the contribution of each control parameter to the prediction of the machine learning model from feature quantity data that is the value of the control parameter of the learning data used for learning of the machine learning model, the processor executes the stability calculation program to evaluate the stability of prediction by the machine learning model in a first space defined by control parameters selected based on the contribution as axes based on whether or not a change of the value of the selected control parameters causes an abnormal change in the prediction of the machine learning model, the processor executes the uncertainty calculation program to evaluate the uncertainty of prediction by the machine learning model in a second space defined by the selected control parameters as axes based on a distribution of the feature quantity data in the second space, and the processor executes the experiment point recommendation program to recommend an experiment point based on the contribution evaluation, the stability evaluation, and the uncertainty evaluation of the selected control parameters to the prediction of the machine learning model.

2. The experiment point recommendation device according to claim 1, wherein in the second space, a contribution conversion value of the control parameter is used as a unit of the value of the selected control parameter as the axis, and the contribution conversion value is calculated as a value obtained by assigning the value of the shape parameter predicted by the machine learning model based on the contribution evaluation of the control parameter.

3. The experiment point recommendation device according to claim 2, wherein in the first space, the unit of the control parameter is used as the unit of the value of the selected control parameter as the axis, and the processor executes the experiment point recommendation program to convert the stability evaluation of the prediction by the machine learning model in the first space into the stability evaluation of the prediction by the machine learning model in the second space, and displays an important area based on the contribution evaluation, the stable area based on the stability evaluation, and the uncertain area based on the uncertainty evaluation in the second space.

4. The experiment point recommendation device according to claim 3, wherein the uncertain area is an area included in a range of the uncertainty evaluation specified by the user.

5. The experiment point recommendation device according to claim 3, wherein the second space in which the important area, the stable area, and the uncertain area are displayed is displayed on a user terminal, and the processor executes the experiment point recommendation program to identify a point specified in the second space displayed on the user terminal by the user as an experiment point.

6. The experiment point recommendation device according to claim 2, wherein in the first space, the unit of the control parameter is used for the unit of the value of the selected control parameter as the axis, and the processor executes the experiment point recommendation program to convert the stability evaluation of the prediction by the machine learning model in the first space into the stability evaluation of the prediction by the machine learning model in the second space, obtain an integrated score based on the value of the stability evaluation and the value of uncertainty in the second space, and specify an experiment point based on the integrated score.

7. An experiment point recommendation method that recommends an experiment point that is a combination of values of control parameters set in a semiconductor processing device for an experiment to obtain learning data of a machine learning model that receives control parameters of the semiconductor processing device and outputs shape parameters that express a processed shape of a semiconductor sample processed by the semiconductor processing device, the method comprising:

a first step of evaluating the contribution of each control parameter to the prediction of the machine learning model from feature quantity data that is the value of the control parameter of the learning data used for learning of the machine learning model;

a second step of evaluating the stability of prediction by the machine learning model in a first space defined by control parameters selected based on the contribution as axes based on whether or not a change of the value of the selected control parameters causes an abnormal change in the prediction of the machine learning model;

a third step of evaluating the uncertainty of prediction by the machine learning model in a second space defined by the selected control parameters as axes based on a distribution of the feature quantity data in the second space; and a fourth step of recommending an experiment point based on the contribution evaluation, the stability evaluation, and the uncertainty evaluation of the selected control parameters to the prediction of the machine learning model.

8. The experiment point recommendation method according to claim 7, wherein in the second space, a contribution conversion value of the control parameter is used as a unit of the value of the selected control parameter as the axis, and the contribution conversion value is calculated as a value obtained by assigning the value of the shape parameter predicted by the machine learning model based on the contribution evaluation of the control parameter.

9. The experiment point recommendation method according to claim 8, wherein in the first space, the unit of the control parameter is used as the unit of the value of the selected control parameter as the axis, and in the fourth step, the stability evaluation of the prediction by the machine learning model in the first space is converted into the stability evaluation of the prediction by the machine learning model in the second space, and an important area based on the contribution evaluation, a stable area based on the stability evaluation, and an uncertain area based on the uncertainty evaluation are displayed in the second space.

10. The experiment point recommendation method according to claim 9, wherein the uncertain area is an area included in a range of the uncertainty evaluation specified by the user.

11. The experiment point recommendation method according to claim 9, wherein the second space in which the important area, the stable area, and the uncertain area are displayed is displayed on a user terminal, and in the fourth step, a point specified in the second space displayed on the user terminal by the user is identified as an experiment point.

12. The experiment point recommendation method according to claim 8,
wherein in the first space, the unit of the control parameter is used for the unit of the value of the selected control parameter as the axis, and
in the fourth step, the stability evaluation of the prediction by the machine learning model in the first space is converted into the stability evaluation of the prediction by the machine learning model in the second space, an integrated score based on the value of the stability evaluation and the value of uncertainty in the second space is obtained, and an experiment point is specified based on the integrated score.

13. A semiconductor device manufacturing system including a semiconductor processing device and a platform that executes an experiment point recommendation process, which is connected to the semiconductor processing device through a network,
wherein the experiment point recommendation process that recommends an experiment point that is a combination of values of control parameters set in the semiconductor processing device for an experiment to obtain learning data of a machine learning model that receives control parameters of the semiconductor processing device and outputs shape parameters that express a processed shape of a semiconductor sample processed by the semiconductor processing device includes:

a step of evaluating the contribution of each control parameter to the prediction of the machine learning model from feature quantity data that is the value of the control parameter of the learning data used for learning of the machine learning model;

a step of evaluating the stability of prediction by the machine learning model in a first space defined by control parameters selected based on the contribution as axes based on whether or not a change of the value of the selected control parameters causes an abnormal change in the prediction of the machine learning model;

a step of evaluating the uncertainty of prediction by the machine learning model in the second space defined by the selected control parameters as axes based on a distribution of the feature quantity data in the second space; and a step of recommending an experiment point based on the contribution evaluation, the stability evaluation, and the uncertainty evaluation of the selected control parameters to the prediction of the machine learning model.

14. The semiconductor device manufacturing system according to claim 13,
wherein the experiment point recommendation process is executed as an application provided in the platform.

* * * * *